United States Patent
Beals

(10) Patent No.: US 11,847,218 B2
(45) Date of Patent: *Dec. 19, 2023

(54) SYSTEMS AND METHODS FOR A VIRUS SCANNING ROUTER

(71) Applicant: DISH Technologies L.L.C., Englewood, CO (US)

(72) Inventor: William Michael Beals, Englewood, CO (US)

(73) Assignee: DISH TECHNOLOGIES L.L.C., Englewood, CO (US)

(*) Notice: Subject to any disclaimer, the term of this patent is extended or adjusted under 35 U.S.C. 154(b) by 152 days.

This patent is subject to a terminal disclaimer.

(21) Appl. No.: 17/182,043

(22) Filed: Feb. 22, 2021

(65) Prior Publication Data

US 2021/0173925 A1    Jun. 10, 2021

Related U.S. Application Data

(63) Continuation of application No. 15/468,568, filed on Mar. 24, 2017, now Pat. No. 10,949,533.

(51) Int. Cl.
    *G06F 21/56*    (2013.01)
    *G06F 21/55*    (2013.01)

(52) U.S. Cl.
    CPC .......... *G06F 21/562* (2013.01); *G06F 21/552* (2013.01)

(58) Field of Classification Search
    CPC .................. G06F 21/552; G06F 21/562

USPC ............................................. 726/24
See application file for complete search history.

(56) References Cited

U.S. PATENT DOCUMENTS

| | | | |
|---|---|---|---|
| 8,281,019 B1 | 10/2012 | Woodard et al. | |
| 2015/0195336 A1 | 7/2015 | Dunlap et al. | |
| 2017/0111374 A1* | 4/2017 | Harris ................. | G06F 21/564 |
| 2018/0198821 A1 | 7/2018 | Gopalakrishna | |
| 2018/0198824 A1 | 7/2018 | Pulapaka et al. | |

OTHER PUBLICATIONS

"Tech Tip: Turn your server into a router," Tech Republic <https://www.techrepublic.com/article/tech-tip-turn-your-server-into-a-router/>, Dec. 8, 2003, 7 pages.

* cited by examiner

*Primary Examiner* — Benjamin A Kaplan
(74) *Attorney, Agent, or Firm* — Jeremiah J. Baunach; VLP Law Group LLP

(57) ABSTRACT

A virus scanning router may manages a local network, including routing network traffic between devices on the network and routing network traffic being sent to and from such devices via an external communication system. The virus scanning router remotely scans for viruses the files stored on one or more such devices on the network. The virus scanning router may be a device trusted by the other devices on local network to facilitate the virus scanning router reading and scanning one or more files stored on such devices for viruses. The virus scanning router also takes corrective actions such as isolating the infected device or isolating an affected network zone to which the remote device belongs.

22 Claims, 6 Drawing Sheets

SYSTEMS AND METHODS FOR A VIRUS SCANNING ROUTER

TECHNICAL FIELD

The technical field relates to computer virus scanning, and more particularly, systems and methods for a virus scanning router.

BRIEF SUMMARY

A virus scanning router remotely scans for viruses one or more files stored on one or more devices on a network for which the router provides network routing services and possibly other network management services. The virus scanning router may be a device trusted by the other devices on the network to facilitate the virus scanning router reading and scanning for viruses the files stored on such devices. The virus scanning router also may perform analyses to determine systemic network infections based on the remote virus scanning and may take corrective actions, such as isolating the infected device or isolating an affected network zone or segment to which the remote device belongs. A computer network may be partitioned into network zones or segments by splitting the computer network into subnetworks, each being a separate network zone or segment. This may be achieved by a combination of firewalls and/or Virtual Local Area Networks (VLANs). With respect to Internet Protocol (IP) networks, computers that belong to a subnetwork are addressed with a common, identical, most-significant bit-group in their IP address. The nature and extent of a network segment or zone depends on the nature of the network and the device or devices used to interconnect end points.

The virus scanning router improves existing virus scanning technology by being able to read and scan for virus files of computers or other devices on the network to which it is connected and recognize whether certain devices, zones or segments of such a network have a systemic problem or infection related to the virus and take corrective actions accordingly for the individual infected devices, zones or segments when the individual infected device may not be able to do so.

The virus scanning router also improves existing virus scanning technology by enabling the virus signatures for the remote devices on the local network to be updated at one central location instead of each device having to download its own set of virus definitions. This saves network resources for the wide area network (WAN) to which the virus scanning router is connected, data storage and processing time for the remote devices on the local network.

BRIEF DESCRIPTION OF THE DRAWINGS

The components in the drawings are not necessarily to scale relative to each other. Like reference numerals designate corresponding parts throughout the several views.

DETAILED DESCRIPTION

Figure 1:
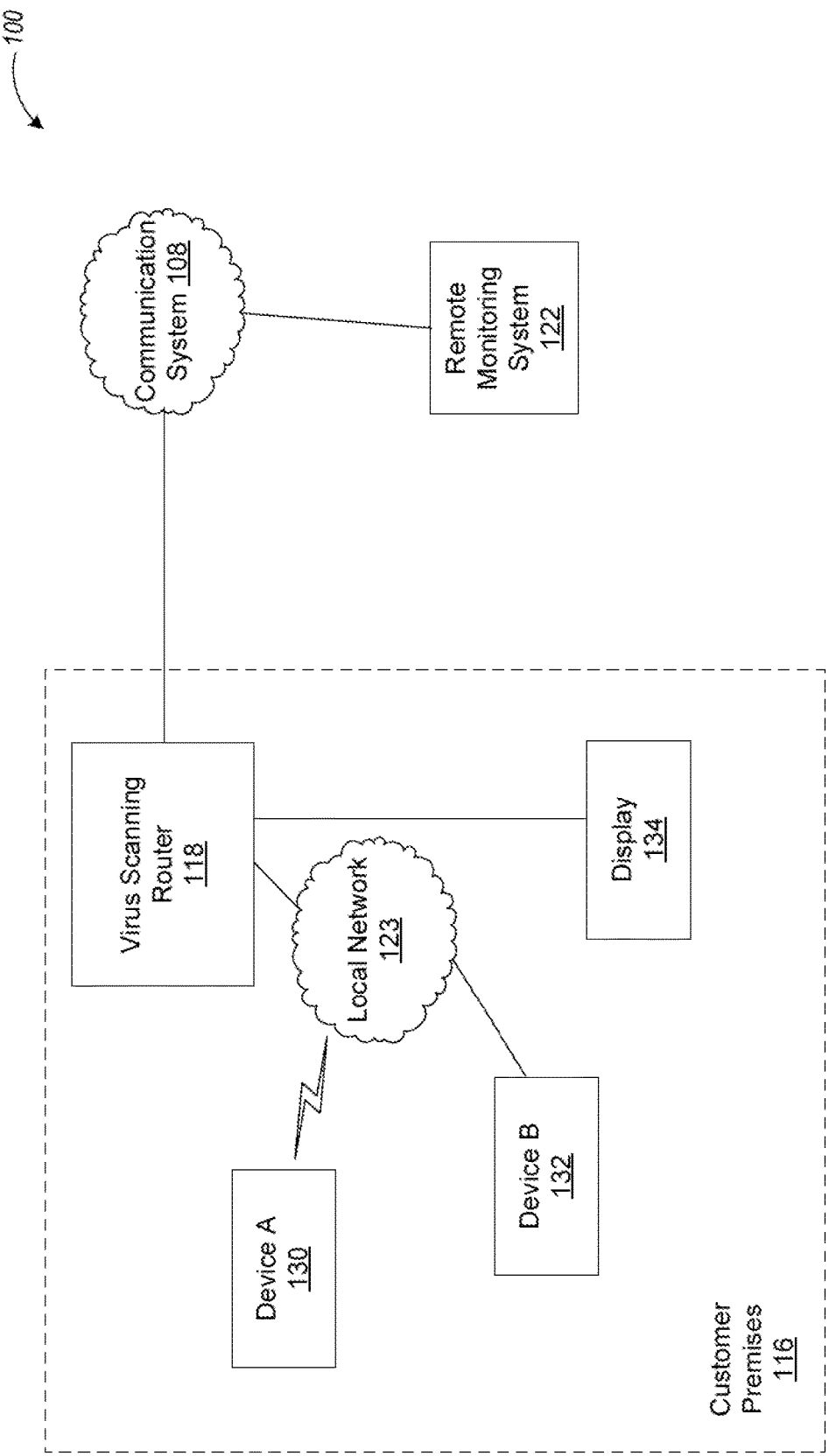
FIG. 1 is a block diagram illustrating an example environment in which various embodiments of systems and methods for a virus scanning router may be implemented, according to one non-limiting embodiment.

FIG. 1 is a block diagram illustrating an example environment in which various embodiments of systems and methods for a virus scanning router 118 may be implemented, according to one non-limiting embodiment. It is to be appreciated that FIG. 1 illustrates just one example of a customer premises 116 environment and that the various embodiments discussed herein are not limited to use of such systems. Customer premises 116 can include a variety of communication systems and can use a variety of devices, including computers, peripheral devices, communication devices, media devices, mobile devices, home entertainment systems, receiving devices, home automation devices, home security devices and home appliances. All or some of such devices are represented by device A and device B and may be network addressable and in operable communication with each other and/or other devices over various networks, such as local network 123 and communication system 108, including the Internet, via the virus scanning router 118. The virus scanning router 118 may manage local network 123, including routing network traffic between such devices on local network 123, such as between device A and device B, and routing network traffic being sent to and from such devices via communication system 108. The virus scanning router 118 also scans for viruses files stored on one or more such devices on local network 123, such as device A 130 and device B 132.

Media devices as described above which may be connected to local network 123 may include, but are not limited to, devices that provide media by satellite, cable and/or Internet streaming services, such as from communication system 108 via virus scanning router 118. Furthermore, home automation service providers, such as, but not limited to, home security service and data service providers, provide their customers a multitude of home automation and/or security services. Such services may include remote monitoring of various home automation devices over telecommunication channels, the Internet or other communication channels and may also include providing equipment and installation of equipment for the service provider and/or user to configure, manage and control the local network 123 to which such devices are connected. According to one embodiment, an example of such equipment is the virus scanning router 118. Examples of such home automation devices may include, but are not limited to, one or more of, or any combination of: a camera, a thermostat, a light fixture, a door sensor, a window sensor, a power outlet, a light switch, a doorbell, a doorbell sensor, a light bulb, a motion sensor, an electrical switch, an appliance switch, a window covering control device, an alarm, a dimmer switch and a door lock. Such devices as described above, for example, are represented by device A 130 and device B 132. In various embodiments, there may be additional or fewer devices than that shown in FIG. 1.

Monitoring and control of the local network 123 to which devices such as device A 130 and device B 132 are connected, and other network services, may be provided by use of the virus scanning router 118 which is communicatively coupled to local network 123. Virus scanning router 118 interconnects wirelessly to one or more devices represented by device A 130 and device B 132, as shown by the wireless connection to device A 130 shown in FIG. 1. In some embodiments, there may be a wired connection to a plurality of such devices via local network 123, as shown by the wired connection to device B 132 shown in FIG. 1. The virus scanning router 118 may receive various commands input by a user on the customer premises 116 and/or from a remote monitoring system 122 over communication system 108, such as from a home automation service provider, home security service, satellite television service provider, cable TV service provider or other data service provider. These commands control the functions of virus scanning router 118 which in turn configures, controls and manages local network 123 to which device A 130 and device B 132 are connected.

According to one embodiment, the virus scanning router scans files stored on one or more of device A 130 and device B 132 for viruses and performs one or more actions based on the results of the virus scanning router 118 scanning the files of the device A 130 and/or device B 132. In some embodiments, the virus scanning router also operates as a home automation hub and configures, controls and manages device A 130 and/or device B 132 via local network 123. For example, the virus scanning router may send a signal to turn off or turn down the lights, turn up or down the temperature setting on a thermostat, initiate a security camera to turn on or start recording, or perform various other home automation functions. Such network management, virus scanning and/or home automation functions may be performed based on a set of conditions or rules implemented and/or stored by the virus scanning router 118 and/or remote monitoring system 122.

Virus scanning router 118 may also provide an interactive user interface to the home automation system that is controlled by an interactive graphical user interface of a device in operable communication with the virus scanning router 118 and/or a remote control device (not shown). This interactive user interface may be communicated to and displayed on a display 134 of a device in operable communication with the virus scanning router 118 (e.g., on a monitor and/or on a display of a mobile device) to enable the user to configure, control and manage the virus scanning of files stored on device A 130 and device B 132 to be performed by the virus scanning router 118 via local network 123. In one example embodiment, the connection between the virus scanning router 118 and the display 134 is a wired connection, such as a wired High-Definition Multimedia Interface (HDMI) connection, which is a point-to-point interface as shown in FIG. 1 or may be a connection made via local network 123 via a network to HDMI bridge. However, in other embodiments, the connection between the virus scanning router 118 and the display 134 may be another type of wired connection or may be a wireless connection. For example, in other embodiments, the display 134 may instead be communicatively connected to the virus scanning router 118 via local network 123 or via communication system 108. In some embodiments, the display 134 is part of the remote monitoring system 122, which is located remotely off the customer premises 116. The remote monitoring system 122 may be a system that centrally monitors and controls the virus scanning and/or other functionalities of a plurality of different virus scanning routers, including virus scanning router 118, over communication system 108, each located at respective different customer premises. In other embodiments, the virus scanning router 118 may be located off the customer premises 116 and/or be located at or be part of the remote monitoring system 122.

In some embodiments, the connection provided by local network 123 between the virus scanning router 118 and the various devices on local network 123, such as device A 130 and device B 132, includes a wireless connection. This wireless connection may, for example, be a ZigBee® network connection based on the IEEE 802.15.4 specification, a Z-Wave® connection, a Wi-Fi connection based on the IEEE 802.11 specifications or a Bluetooth® connection, or another wireless connection based on protocols for communication among devices used for home automation, including those that use radio frequency (RF) for signaling and control. In some embodiments, different devices may have different types of wireless connections to the virus scanning router 118 via local network 123. Often, such wireless connections involve a network pairing over local network 123 between the virus scanning router 118 and the various devices, such as device A 130 and device B 132 and/or network pairing between device A 130 and device B managed by virus scanning router 118. The connection provided by local network 123 between the virus scanning router 118 and the various devices on local network 123, such as device A 130 and device B 132, may also or instead include one or more wired networking interfaces such as, for example, 10-baseT specified in the IEEE 802.3 standard, 10/100 Ethernet, or Gigabit Ethernet (GbE or 1 GigE) as defined by the IEEE 802.3-2008 standard.

The virus scanning router 118 may include, be part of, or be operably connected to devices such as a "television converter," "receiver," "set-top box," "television," "television receiver," "television recording device," "satellite set-top box," "satellite receiver," "cable set-top box," "cable receiver," "media player," "Internet streaming device" and/or "television tuner." For example, the virus scanning router 118 may receive user input to cause the virus scanning router 118 to cause a menu for virus scanning of files stored on device A 130 and device B 132 to be displayed on the display 134 along with a television program being displayed on the display 134. The virus scanning router 118 may be any suitable device or electronic equipment that is operable to control, configure, provide network services to and/or manage local network 123 and also provides one or more virus scanning functionalities of device A 130 and/or device B 132 as described herein. Further, the virus scanning router 118 may itself include user interface devices, such as buttons, switches and displays. In many applications, the remote-control device (not shown) is operable to control the virus scanning router 118, device A and/or device B.

Other examples of device A or device B include, but are not limited to, a Network Addressable Storage (NAS) device, a tablet computer, a smart phone, a printer, a television ("TV"), a personal computer ("PC"), a sound system receiver, a digital video recorder ("DVR"), game system, a presentation device, or the like. Presentation devices may employ a display, such as display 134, one or more speakers (not shown), and/or other output devices to communicate video and/or audio content to a user. In many implementations, one or more presentation devices reside in or near a customer's premises 116 and are communicatively coupled, directly or indirectly, to the virus scanning router 118. Further, the virus scanning router 118 and the presentation device may be integrated into a single device. Such a single device may have the functionality of the virus scanning router 118 described herein and the presentation device, or may even have additional functionality.

Local network 123 may be a communication system or networked system, to which virus scanning router 118, device A, device B, and/or a variety of other auxiliary devices (collectively referred to herein as endpoint devices) are connected. Non-limiting examples of such a networked system or communication system include, but are not limited to, an Ethernet system, twisted pair Ethernet system, an intranet, a local area network ("LAN") system, short range wireless network (e.g., Bluetooth®), a personal area network (e.g., a ZigBee network based on the IEEE 802.15.4 specification), a Z-Wave® network, a Consumer Electronics Control (CEC) communication system or the like. One or more endpoint devices, such as PCs, data storage devices, TVs, game systems, sound system receivers, NAS devices, tablet computers, smart phones, printers or the like, may be communicatively coupled to the local network 123 so that the plurality of endpoint devices are communicatively coupled together. Thus, such a network allows the interconnected endpoint devices, and the virus scanning router 118, to communicate with each other and to other devices via communication system 108. Alternatively, or in addition, some devices in the customer premises 116 may also be directly connected to the communication system 108, such as a telephone which may employ a hardwire connection or an RF signal for coupling to the network, which may also connect to other networks or communications systems outside customer premises 116.

The above description of the customer premises 116, and the various devices therein, is intended as a broad, non-limiting overview of an example environment in which various embodiments of systems and methods for a virus scanning router may be implemented. The customer premises 116 and the various devices therein may contain other devices, systems and/or media not specifically described herein.

Example embodiments described herein provide applications, tools, data structures and other support to implement systems and methods for a virus scanning router. In the following description, numerous specific details are set forth, such as data formats, code sequences, and the like, in order to provide a thorough understanding of the described techniques. The embodiments described also can be practiced without some of the specific details described herein, or with other specific details, such as changes with respect to the ordering of the code flow, different code flows, and the like. Thus, the scope of the techniques and/or functions described are not limited by the particular order, selection, or decomposition of steps described with reference to any particular module, component, or routine.

Figure 2:
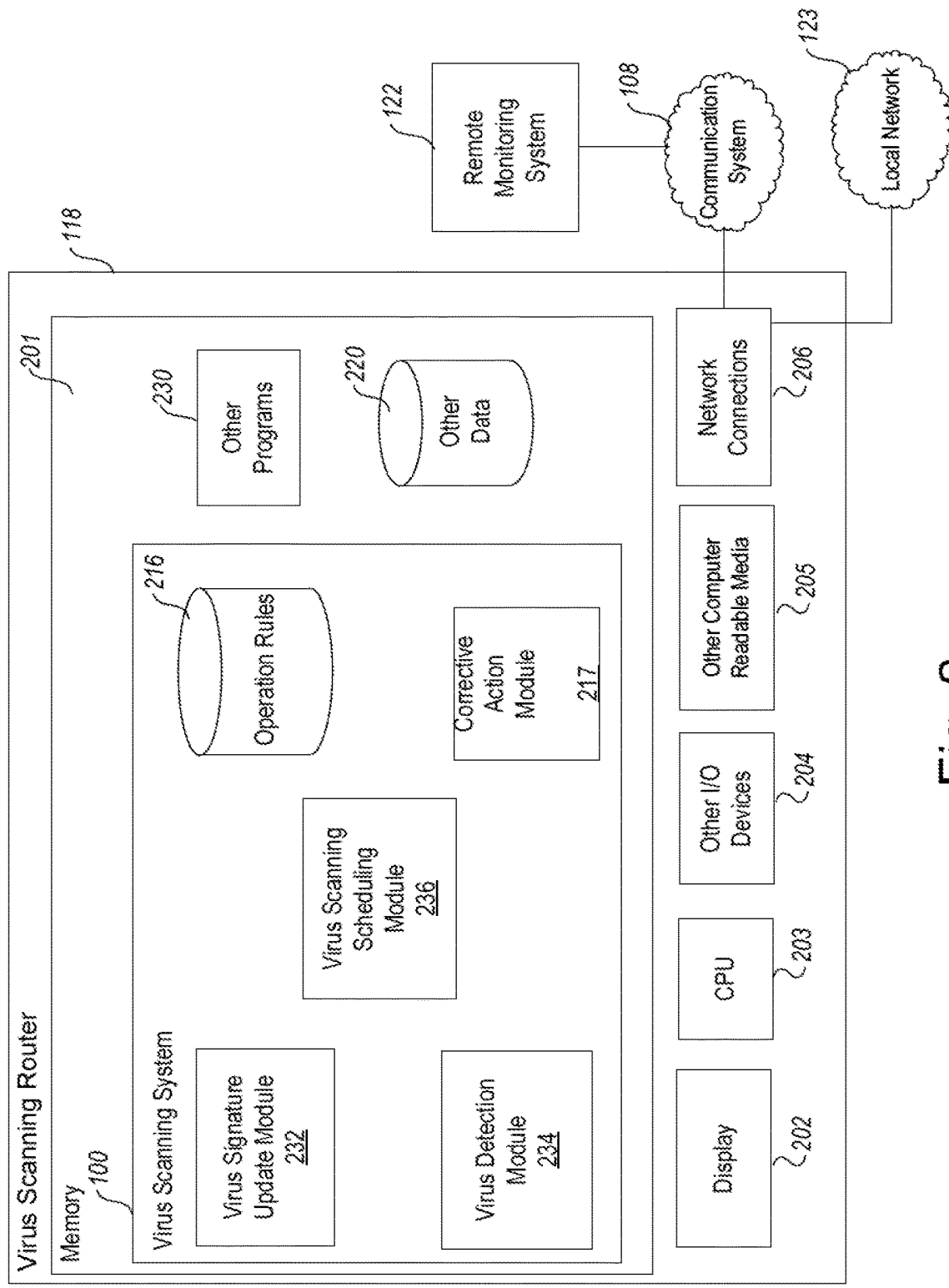
FIG. 2 is a block diagram illustrating elements of an example virus scanning router, according to one non-limiting embodiment.

FIG. 2 is a block diagram illustrating elements of an example virus scanning router 118, according to one non-limiting embodiment.

In one embodiment, virus scanning router 118 is a computer network router and/or network gateway device configured to provide network routing services to network addressable devices operably connected to local network 123, as shown in FIG. 1. In some embodiments, the virus scanning router 118 is part of a presentation device, such as a television, a set-top box device or part of a mobile device or other portable computing device. Note that one or more general purpose or special purpose computing systems/devices may be used to implement the virus scanning router 118, and communicate over local network 123 and communication system 108. Also, virus scanning router 118 may operate on an open platform system or closed platform system. In a closed platform system, an entity providing the virus scanning router 118, such as the home automation or data service provider has, via software and/or hardware security controls, control over all applications, content or media stored on the virus scanning router 118, or otherwise restricts access to change the operation or configuration of the virus scanning router 118. This is in contrast to an open platform, where end users and customers generally have unrestricted access to applications, content, configuration and operation of the virus scanning router. In either case, virus scanning router 118 may be a device trusted by the other devices on the local network 123, or have an increased trust level with respect to such devices, to facilitate the virus scanning router reading and scanning for viruses one or more files stored on such devices.

In addition, the virus scanning router 118 may comprise one or more distinct computing systems/devices and may span distributed locations. Furthermore, each block shown may represent one or more such blocks as appropriate to a specific embodiment or may be combined with other blocks. Also, the virus scanning system 100 of the virus scanning router 118 may be implemented in software, hardware, firmware, or in some combination to achieve the capabilities described herein.

In the embodiment shown, virus scanning router 118 comprises a computer memory ("memory") 201, a display 202, one or more Central Processing Units ("CPU") 203, Input/Output devices 204 (e.g., keyboard, mouse, RF or infrared receiver, light emitting diode (LED) panel or liquid crystal display (LCD), USB ports, other communication ports, and the like), other computer-readable media 205, and network connections 206. The operation rules stored in the operation rules store 216 and virus scanning system 100 portions are shown residing in memory 201. In other embodiments, some portion of the contents, and some, or all, of the components of operation rules stored in the operation rules store 216 and virus scanning system 100 may be stored on the other computer-readable media 205. The operation rules stored in the operation rules store 216 and virus scanning system 100 components of the virus scanning router 118 preferably execute on one or more CPUs 203 and facilitate the virus scanning activity as described herein. The virus scanning system 100 also facilitates communication with peripheral devices and remote systems, such as remote monitoring system 122, via the I/O devices 204 and network connections 206. For example, the virus scanning system 100 may also interact via the communication system 108 with other devices and systems such as the remote monitoring system 122, which may be a system of an entity providing the virus scanning router 118, such as the home automation or data service provider or the like.

A virus detection module 234 of the virus scanning system 100 reads one or more files stored on a device located remotely from the virus scanning router 118 on the local network 123 and to which the virus scanning router 118 provides network routing services. The virus detection module 234 causes the virus scanning router 118 to scan the read files for computer viruses and to perform an action based on results. A computer virus may be a piece of code that is typically capable of copying itself and has a detrimental effect, such as corrupting the system or destroying data. Thus, a computer or other device already infected with a virus may be so disabled or corrupted as to not be able to properly perform a virus scan itself, recognize it has been infected or take the appropriate corrective action. Therefore, the virus scanning router 118 improves existing virus scanning technology by being able to read and scan for virus foes of computers or other devices on the network to which it is connected and recognize whether certain devices, zones or segments of such a network have a systemic problem or infection related to the virus and take corrective actions accordingly for the individual infected devices, zones or segments when the individual infected device would not be able to do so itself.

For example, in response to the virus detection module 234 of the virus scanning router 118 finding that one or more files stored on the remote device scanned by the virus scanning router 118 contains a computer virus, the corrective action module 217 may isolate or perform one or more computer virus quarantine actions with respect to the remote device on the local network 123 that the virus scanning router 118 manages. In some embodiments, this isolation or virus quarantine action may include the corrective action module 217 blocking or otherwise restricting network traffic to and/or or from the infected device. The corrective action module 217 may take other or additional actions such as performing or causing the infected device to perform one or more computer virus recovery or repair actions over local network 123.

The corrective action module 217 may also or instead send an alert to one or more other devices connected to the local network 123 or to other systems over communication system 108, such as remote monitoring system 122. The remote monitoring system 122 may then take further action in response to the alert or other information sent regarding the virus scanning of the virus scanning router. Such actions may include, for example, triggering other virus scanning on other devices on other networks, sending commands to other virus scanning routers to perform such activities on the networks they respectively manage and/or update a database or log of virus scanning activity and results to track long term or other wide ranging systemic issues the service provider may be having regarding virus intrusions.

In some embodiments, the virus detection module 234 may cause the virus scanning router 118 to scan the files of the remote devices for computer viruses by causing the virus scanning router 118 to compare data read from files with known signatures of computer viruses. In some embodiments, the virus detection module 234 causes the virus scanning router 118 to scan for computer viruses different files stored on each remote device on the local network 123 using a different set of virus signatures stored on the router for each device. Such signatures of computer viruses may be updated from time to time or periodically by the virus signature update module 232. The virus signature update module 232 may receive such updated virus definitions from a remote system, such as the remote monitoring system 122 or from the devices on the local network 123 that are to be scanned. The virus scanning router 118 thus improves existing virus scanning technology by enabling the virus signatures for the remote devices on the local network 123 to be updated at one central location instead of each device having to download its own set of virus definitions. This saves network resources for the WAN to which the virus scanning router is connected, data storage and processing time for the remote devices on the local network 123. This also provides the ability to scan for viruses foes of devices that would not otherwise be able to scan themselves for viruses due to the particular device's capabilities. For example, many Internet of Things (IoT) devices are objects or appliances that may not have built-in virus scanning capabilities. Also, many NAS servers may have limited ability to perform virus scanning on themselves.

The virus scanning scheduling module 236 may schedule files of the plurality of devices located on the local network 123 remotely from the virus scanning router 118 for scanning by the virus scanning router 118 at different times. These different times may be selected such that network resources and processor time are used more efficiently, such as, for example, at times when such network bandwidth of the local network 123 and/or percentage of usage of the processor 203 are lower or lowest, or otherwise based on network traffic conditions. The scheduling may also include scheduling of files for scanning by the virus scanning router 118 at different times based on different levels of use and/or different types of use of the devices. In some embodiments, scanning of a device's files may be automatically scheduled for when that particular device is typically at a low use level. For example, a garage door opener may typically have lower use levels during the day when the customer is at work and thus the virus scanning scheduling module 236 may recognize this and schedule the virus scan for that device during the day. Also, certain devices may be selected to have their files scanned based on whether or not they would otherwise be able to scan themselves for viruses due to the particular device's capabilities. For example, many Internet of Things (IoT) devices are objects or appliances that may not have built-in virus scanning capabilities Also, many NAS servers may have limited ability to perform virus scanning on themselves. Thus, in some embodiments, only those devices that are not able or have limited ability to scan themselves for viruses may be selected to have theft files scanned for viruses by the virus scanning router 118.

The various rules of operations that implement the functionality of the virus scanning system 100 described herein and selectable options of the virus scanning system 100 described herein may be stored in the operation rules store 216 and updated locally or remotely, such as, for example, from updates received by the remote monitoring system 122.

Other code or programs 230 (e.g., routing or other network management software, and the like), and potentially other data repositories, such as other data store 220, which may store other network routing and management data, such as routing tables, also reside in the memory 201, and preferably execute on one or more CPUs 203. Of note, one or more of the components in FIG. 2 may not be present in any specific implementation. For example, some embodiments may not provide other computer-readable media 205 or a display 202.

In some embodiments, the virus scanning system 100 includes an application program interface ("API") that provides programmatic access to one or more functions of the virus scanning system 100. Such an API may provide a programmatic interface to one or more functions of the virus scanning system 100 that may be invoked by one of the other programs 230, the remote monitoring system 122 or some other module. In this manner, the API enables software, such as user interfaces, plug-ins and adapters to integrate functions of the virus scanning system 100 into desktop computer or mobile device applications, and the like.

The API may be, in at least some embodiments, invoked or otherwise accessed via the virus scanning system 100, or remote entities, the remote monitoring system 122, to access various functions of the virus scanning system 100. For example, the remote monitoring system 122 may select particular criteria, remote devices, virus signatures, scanning schedules, corrective actions, selection processes, monitoring time windows, etc., to be used by the virus scanning system 100; perform particular configurations of the virus scanning router 118; or remotely control the virus scanning router 118 via the API.

In an example embodiment, components/modules of the virus scanning system 100 are implemented using standard programming techniques. For example, the operation rules stored in the operation rules store 216 and the various modules of the virus scanning system 100 may be implemented as a "native" executable running on the CPU 203, along with one or more static or dynamic libraries. In other embodiments, the operation rules stored in the operation rules store 216 and the various modules of the virus scanning system 100 may be implemented as instructions processed by a virtual machine that executes as one of the other programs 230. In general, a range of programming languages known in the art may be employed for implementing such example embodiments, including representative implementations of various programming language paradigms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), or declarative (e.g., SQL, Prolog, and the like).

In a software or firmware implementation, instructions stored in a memory configure, when executed, one or more processors of the virus scanning router 118 to perform the functions of the virus scanning system 100 described herein. In one embodiment, instructions cause the CPU 203 or some other processor, such as an I/O controller/processor, to perform the remote virus scanning operations and implement the functionality of the virus scanning system 100 described herein. Similarly, the CPU 203 or other processor may be configured to perform other operations such as to perform other network management and routing services.

The embodiments described above may also use well-known or other synchronous or asynchronous client-server computing techniques. However, the various components may be implemented using more monolithic programming techniques as well; for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs. Some embodiments may execute concurrently and asynchronously, and communicate using message passing techniques. Equivalent synchronous embodiments are also supported by a receiving device virus scanning system 100 implementation. Also, other functions could be implemented and/or performed by each component/module, and in different orders, and by different components/modules, yet still achieve the functions of the virus scanning system 100.

In addition, programming interfaces to the data stored as part of the virus scanning system 100, can be available by standard mechanisms such as through C, C++, C#, and Java APIs; libraries for accessing files, databases, or other data repositories; scripting languages such as XML; or Web servers, FTP servers, or other types of servers providing access to stored data. The operation rules store 216 and other data store 220 may be implemented as one or more database systems, file systems, or any other technique for storing such information, or any combination of the above, including implementations using distributed computing techniques.

Different configurations and locations of programs and data are contemplated for use with techniques described herein. A variety of distributed computing techniques are appropriate for implementing the components of the illustrated embodiments in a distributed manner including but not limited to TCP/IP sockets, RPC, RMI, HTTP, and Web Services (XML-RPC, JAX-RPC, SOAP, and the like). Other variations are possible. Other functionality could also be provided by each component/module, or existing functionality could be distributed amongst the components/modules in different ways, yet still achieve the functions of the virus scanning system 100.

Furthermore, in some embodiments, some or all of the components of the virus scanning system 100 may be implemented or provided in other manners, such as at least partially in firmware and/or hardware, including, but not limited to one or more application-specific integrated circuits ("ASICs"), standard integrated circuits, controllers (e.g., by executing appropriate instructions and including microcontrollers and/or embedded controllers), field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; or other non-transitory computer-readable storage medium to be read by an appropriate drive or via an appropriate connection, such as a DVD, random access memory (RAM) or flash memory device) so as to enable or configure the computer-readable medium and/or one or more associated computing systems or devices to execute or otherwise use or provide the contents to perform at least some of the described techniques. A transitory computer-readable medium as used herein means a signal transmission itself (for example, a propagating electrical or electromagnetic signal itself) and not the hardware medium on which information is stored. Some or all of the system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

Figure 3:
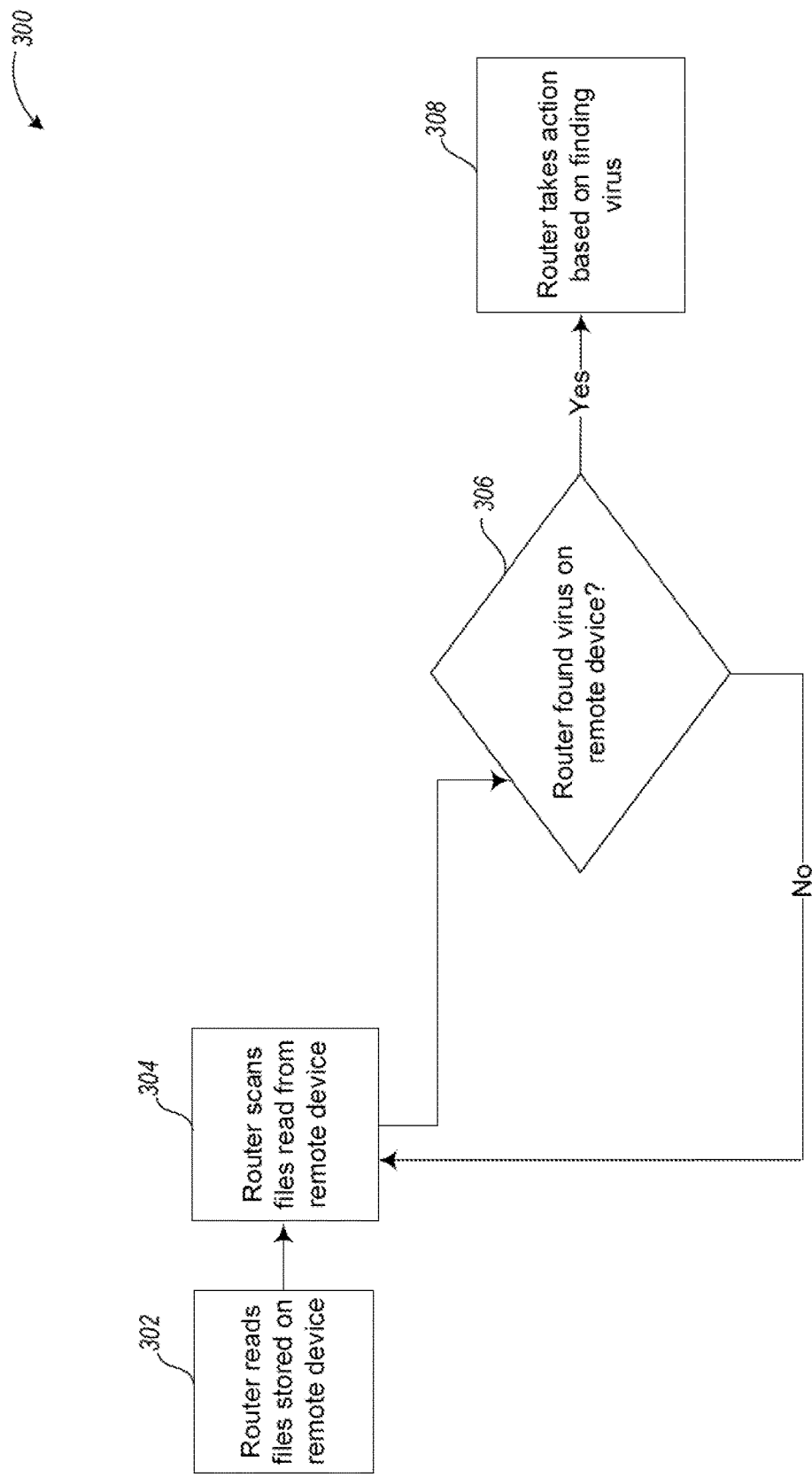
FIG. 3 is a flow diagram of an example method for router virus scanning, according to one non-limiting embodiment.

FIG. 3 is a flow diagram of an example method 300 for router virus scanning, according to one non-limiting embodiment.

At 302, the virus scanning router 118 reads files stored on the remote device. For example, this may occur over local network 123 to which the devices and the virus scanning router 118 are connected.

At 304, the virus scanning router 118 scans files read from the remote device. For example, this may include comparing data read from the files with known signatures of computer viruses.

At 306, the virus scanning router 118 determines whether a virus was found on the remote device. If the virus scanning router 118 determines that a virus was found on the remote device, then the process proceeds to 308. If the virus scanning router 118 determines that a virus was not found on the remote device, then the process proceeds back to 304 and continues scanning the files read from the device.

At 308, the virus scanning router 118 takes action based on finding the virus on the remote device. For example, in response to the virus detection module 234 of the virus scanning router 118 finding that one or more files stored on the remote device scanned by the virus scanning router 118 contains a computer virus, the virus scanning router 118 may isolate or perform one or more computer virus quarantine actions with respect to the remote device on the local network 123 that the virus scanning router 118 manages. In some embodiments, this isolation or virus quarantine action may include the virus scanning router 118 blocking or otherwise restricting network traffic to and/or or from the infected device.

Figure 4:
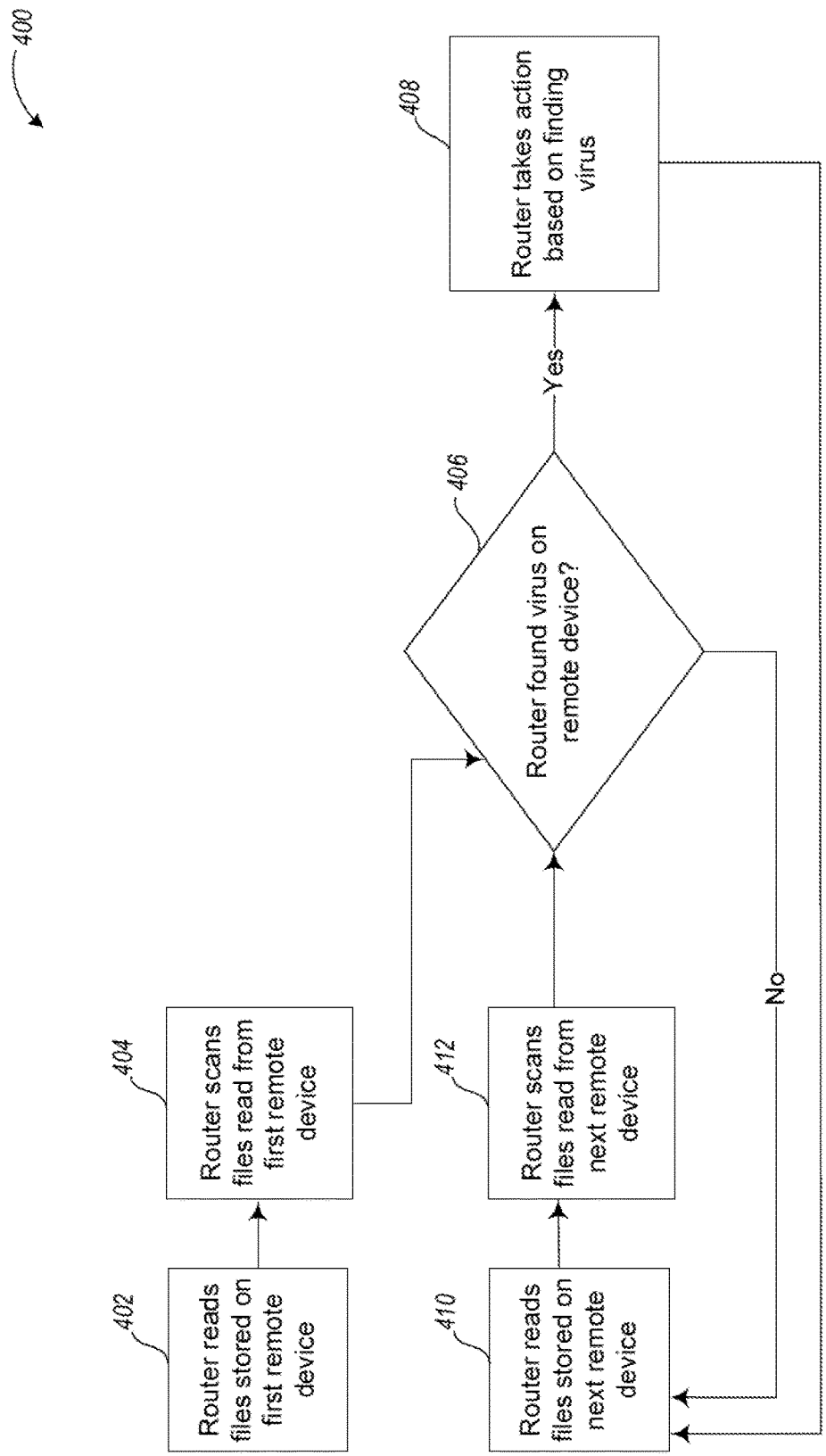
FIG. 4 is a flow diagram of an example method for router virus scanning of multiple remote devices, according to one non-limiting embodiment.

FIG. 4 is a flow diagram of an example method 400 for router virus scanning of multiple remote devices, according to one non-limiting embodiment.

At 402, the virus scanning router 118 reads files stored on a first remote device.

At 404, the virus scanning router 118 scans files read from the first remote device.

At 406, the virus scanning router 118 determines whether a virus was found on the remote device. If the virus scanning router 118 determines that a virus was found on the remote device, then the process proceeds to 408. If the virus scanning router 118 determines that a virus was not found on the remote device, then the process proceeds back to 410.

At 408, the virus scanning router 118 takes an action based on finding the virus on the remote device. For example, in response to the virus detection module 234 of the virus scanning router 118 finding that one or more files stored on the remote device scanned by the virus scanning router 118 contains a computer virus, the virus scanning router 118 may isolate or perform one or more computer virus quarantine actions with respect to the remote device on the local network 123 that the virus scanning router 118 manages. The scanning router 118 may take other or additional actions such as performing or causing the infected device to perform one or more computer virus recovery or repair actions over local network 123.

At 402, the virus scanning router 118 reads files stored on the next remote device. For example, after performing a virus scan on the first remote device on local network 123, the virus scanning router 118 proceeds to another remote device on local network 123 in a list of remote devices stored on the virus scanning router 118 whose files are to be scanned for viruses.

At 412, the virus scanning router 118 scans files read from the next remote device and then proceeds again to 406.

Figure 5:
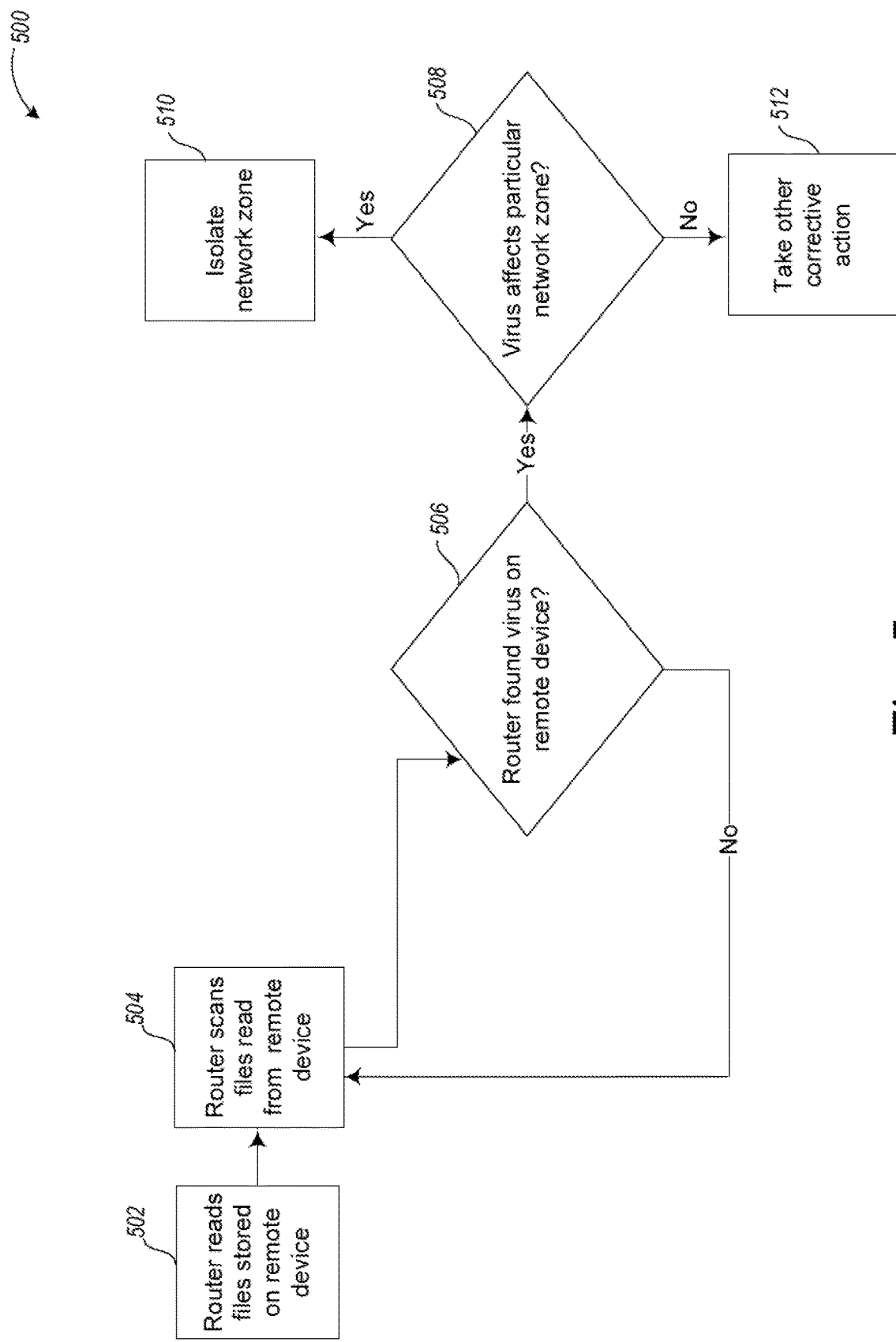
FIG. 5 is a flow diagram of an example method for router virus scanning involving isolating network zones, according to one non-limiting embodiment.

FIG. 5 is a flow diagram of an example method 500 for router virus scanning involving isolating network zones, according to one non-limiting embodiment.

At 502, the virus scanning router 118 reads files stored on a remote device.

At 504, the virus scanning router 118 scans the files read from the remote device.

At 506, the virus scanning router 118 determines whether a virus was found on the remote device. If the virus scanning router 118 determines that a virus was found on the remote device, then the process proceeds to 508. If the virus scanning router 118 determines that a virus was not found on the remote device, then the process proceeds back to 504.

At 508, the virus scanning router 118 determines whether the virus found on the remote device affects a particular network zone. For example, the virus scanning router 118 can determine whether the virus found on the remote device affects a particular network zone based on the network zone to which the device the virus was found on belongs. Also, if other devices in that network zone were found to have viruses, or even the same virus, then the virus scanning router 118 may use this information as a basis for determining that the virus found on the remote device affects that entire network zone. If the virus scanning router 118 determines that the virus found on the remote device affects a particular network zone, then the process proceeds to 510. If the virus scanning router 118 determines that the virus found on the remote device does not affect that entire network zone, then the process proceeds to 512.

At 510, the virus scanning router 118 isolates the affected network zone. In some embodiments, this isolation or action may include the virus scanning router 118 blocking or otherwise restricting network traffic to and/or or from the affected zone.

At 512, the virus scanning router 118 takes other corrective action. This other action may be, for example, the virus scanning router 118 performing or causing the infected device to perform one or more computer virus recovery or repair actions over local network 123.

Figure 6:
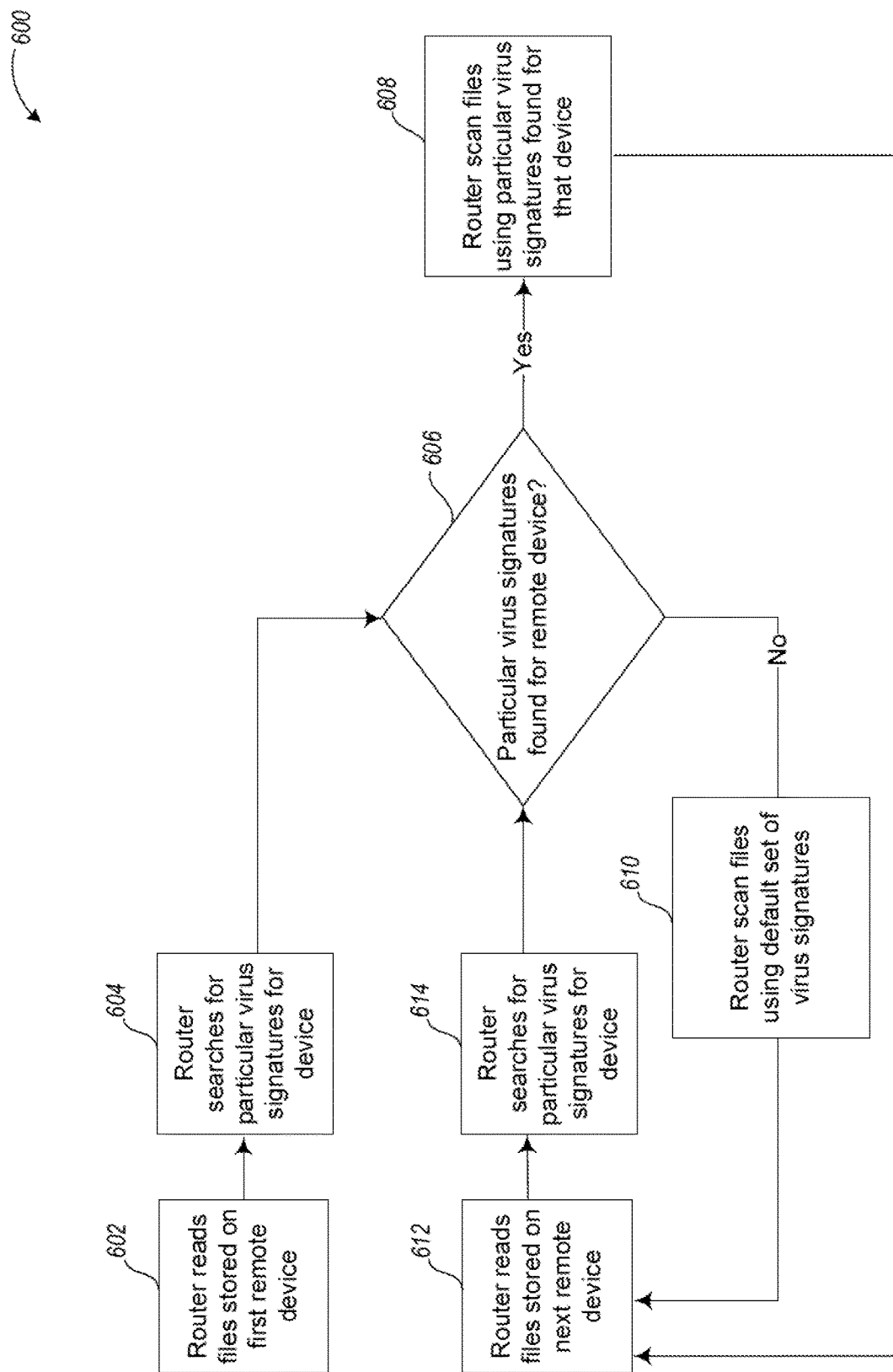
FIG. 6 is a flow diagram of an example method for router virus scanning with the router using particular virus signatures for particular remote devices, according to one non-limiting embodiment.

FIG. 6 is a flow diagram of an example method 600 for router virus scanning with the router using particular virus signatures for particular remote devices, according to one non-limiting embodiment.

At 602, the virus scanning router 118 reads files stored on a first remote device.

At 604, the virus scanning router 118 searches for particular virus signatures for the device. The virus scanning router 118 may search for such virus signatures in a database stored on the virus scanning router 118 itself or on other remote systems, such as on remote monitoring system 122 or on the device or devices to be scanned.

At 606, the virus scanning router 118 determines whether particular virus signatures were found for the remote device. In particular, the virus scanning router 118 may scan for computer viruses different files stored on each remote device on the local network 123 using a different set of virus signatures stored on the router for each device. If the virus scanning router 118 finds the particular virus signatures for the remote device to be scanned, then the process proceeds to 608. If the virus scanning router 118 does not find the particular virus signatures for the remote device to be scanned, then the process proceeds to 610.

At 608, the virus scanning router 118 scan files of the remote device using particular virus signatures found for that device.

At 610, the virus scanning router 118 scans files of the remote device using a default set of virus signatures.

At 612, the virus scanning router 118 reads files stored on the next remote device.

At 614, the virus scanning router 118 searches for particular virus signatures for the next device and then proceeds to 606 to determine whether particular virus signatures were found for the next remote device.

The invention claimed is:

1. A computer network gateway, comprising:
   at least one processor; and
   at least one memory coupled to the at least one processor, wherein the at least one memory has computer-executable instructions stored thereon that, when executed by the at least one processor, cause the at least one processor to:
   provide network routing services to network addressable devices operably connected to the gateway including a device located remotely from the gateway;
   provide Internet service to the device via the gateway from a service provider that includes a telecommunication channel;

provide television service to the device;
read one or more files stored on the device;
cause the gateway to scan for computer viruses the one or more read files stored on a device located remotely from the gateway and to which the gateway network routing services; and
perform an action based on results of the gateway scanning the one or more read files of the remote device for computer viruses, wherein performing the action based on the results of the gateway scanning the one or more read files of the remote device for computer viruses includes, in response to the gateway finding that the one or more files stored on the remote device scanned by the gateway contains a computer virus, isolating the remote device from a network that the gateway manages and to which the remote device is connected.

2. The gateway of claim 1 wherein performing the action based on the results of the gateway scanning the one or more read files of the remote device for computer viruses includes:
in response to the gateway finding that the one or more files stored on the remote device scanned by the gateway contains a computer virus, performing one or more computer virus quarantine actions over a network that the gateway manages and to which the remote device is connected.

3. The gateway of claim 1 wherein performing the action based on the results of the gateway scanning the one or more read files of the remote device for computer viruses includes:
in response to the gateway finding that the one or more files stored on the remote device scanned by the gateway contains a computer virus, performing one or more computer virus recovery or repair actions over a network that the gateway manages and to which the remote device is connected.

4. The gateway of claim 1 wherein performing the action based on the results of the gateway scanning the one or more read files of the remote device for computer viruses includes:
in response to the gateway finding that the one or more files stored on the remote device scanned by the gateway contains a computer virus, sending an alert to one or more other devices over a network that the gateway manages and to which the remote device and the one or more other devices are connected or to one or more devices over an external network that the gateway does not manage.

5. The gateway of claim 1 wherein causing the gateway to scan the one or more read files for computer viruses includes causing the gateway to compare data read from the one or more files with known signatures of computer viruses.

6. A computerized method for a computer network gateway, the method comprising:
providing network routing services to a plurality of network addressable devices operably connected to the gateway including a device located remotely from the gateway;
providing Internet service to the device via the gateway from a service provider that includes a telecommunication channel;
providing television services to the device;
reading, by at least one processor of the gateway, different files stored on the plurality of devices located remotely from the gateway and to which the gateway provides network routing services;
scanning for computer viruses the one or more different read files stored on the plurality of devices located remotely from the gateway, by at least one processor of the gateway; and
performing, by at least one processor of the gateway, an action based on results of the gateway scanning for computer viruses the one or more different read files stored on the plurality of devices, wherein performing the action based on the results of the gateway scanning the one or more read files of the remote device for computer viruses includes:
for at least one of the plurality of devices located remotely from the gateway, in response to the gateway finding that the one or more files stored on the at least one device scanned by the gateway contains a computer virus, determining, by at least one processor of the gateway, whether the computer virus contained in the one or more files stored on the at least one device affects a particular network zone, to which the at least one device and additional devices belong, on a network the gateway manages and to which the additional devices are connected; and
in response to the gateway determining that the computer virus contained in the one or more files stored on the at least one device affects the particular network zone, isolating the network zone on the network that the gateway manages.

7. The method of claim 6, further comprising managing, by at least one processor of the gateway, a network to which the gateway and the plurality of devices are connected.

8. The method of claim 7, further comprising managing, by at least one processor of the gateway, computer virus scanning by the gateway of files of the plurality of devices located remotely from the gateway.

9. The method of claim 7 further comprising scheduling, by at least one processor of the gateway, files of the plurality of devices located remotely from the gateway for scanning by the gateway at different times.

10. The method of claim 9 wherein the scheduling files of the plurality of devices located remotely from the gateway for scanning by the gateway at different times includes scheduling files on the plurality of devices located remotely from the gateway for scanning by the gateway at different times based on network traffic conditions.

11. The method of claim 9 wherein the scheduling files of the plurality of devices located remotely from the gateway for scanning by the gateway at different times includes scheduling files of the plurality of devices located remotely from the gateway for scanning by the gateway at different times based on different levels of use of the plurality of devices.

12. The method of claim 9 wherein the scheduling files of the plurality of devices located remotely from the gateway for scanning by the gateway at different times includes scheduling files of the plurality of devices located remotely from the gateway for scanning by the gateway at different times based different types of use of the plurality of devices.

13. A non-transitory computer-readable medium having computer-executable instructions stored thereon that, when executed by at least one processor, cause the at least one processor to:
provide network routing services to a plurality of network addressable devices operably connected to a computer network gateway including a device located remotely from the gateway;

provide Internet service to the device via the gateway from a service provider that includes a telecommunication channel;

provide television service to the device;

store different sets of virus signatures on the gateway for each device of the plurality of devices located remotely from the gateway on a network which is managed by the gateway;

for each device of the plurality of devices located remotely from the gateway, causing the gateway to scan for computer viruses one or more different files stored on the device and remotely located from the gateway using a different set of virus signatures of the different sets of virus signatures stored on the gateway for each device of the plurality of devices located remotely from the gateway; and for at least one of the plurality of devices located remotely from the gateway, in response to the gateway finding that the one or more files stored on the at least one device scanned by the gateway contains a computer virus, determining whether the computer virus contained in the one or more files stored on the at least one device affects a particular network zone, to which the at least one device and additional devices belong, on a network that the gateway manages and to which the additional devices are connected; and in response to the gateway determining that the computer virus contained in the one or more files stored on the at least one device affects the particular network zone, isolating the network zone on the network that the gateway manages.

14. The non-transitory computer-readable medium of claim 13 wherein the plurality of devices for which files stored on the plurality of devices are scanned by the gateway includes a home appliance.

15. The non-transitory computer-readable medium of claim 13 wherein the plurality of devices for which files stored on the plurality of devices are scanned by the gateway includes a home security device.

16. The non-transitory computer-readable medium of claim 13 wherein the plurality of devices for which files stored on the plurality of devices are scanned by the gateway includes a computer.

17. The non-transitory computer-readable medium of claim 13 wherein the plurality of devices for which files stored on the plurality of devices are scanned by the gateway includes a smartphone.

18. The non-transitory computer-readable medium of claim 13 wherein the plurality of devices for which files stored on the plurality of devices are scanned by the gateway includes a set-top box.

19. The non-transitory computer-readable medium of claim 13 wherein the plurality of devices for which files stored on the plurality of devices are scanned by the gateway includes a device running a closed platform operating system.

20. The non-transitory computer-readable medium of claim 13 wherein the gateway is a device running on a closed platform operating system.

21. The non-transitory computer-readable medium of claim 13 wherein the gateway is a device trusted by the plurality of devices over the network.

22. The non-transitory computer-readable medium of claim 13 wherein the plurality of devices for which files stored on the plurality of devices are scanned by the gateway includes one or more of: a home security device, a door lock, a video camera, a baby monitor, a light switch, a thermostat, a garage door opener, a kitchen appliance, a washing machine and a dryer.

* * * * *